(12) United States Patent
Schranz et al.

(10) Patent No.: US 7,546,914 B2
(45) Date of Patent: Jun. 16, 2009

(54) ALL-WHEEL TRANSMISSION SYSTEM

(75) Inventors: Jürgen Schranz, Graz (AT); Bernd Gsell, Graz (AT); Klaus Lippitsch, Graz (AT); Thomas Papst, Wildon (AT)

(73) Assignee: Magna Powertrain AG & Co KG, Lannach (AT)

( * ) Notice: Subject to any disclaimer, the term of this patent is extended or adjusted under 35 U.S.C. 154(b) by 328 days.

(21) Appl. No.: 11/493,999

(22) Filed: Jul. 27, 2006

(65) Prior Publication Data
US 2007/0023249 A1 Feb. 1, 2007

(30) Foreign Application Priority Data
Jul. 29, 2005 (AT) ............... GM523/2005

(51) Int. Cl.
*B60K 17/34* (2006.01)
*F16D 21/02* (2006.01)

(52) U.S. Cl. .............. 192/48.4; 192/48.2; 192/48.5; 192/48.8

(58) Field of Classification Search ........... 192/48.5, 192/53.1, 48.4
See application file for complete search history.

(56) References Cited

U.S. PATENT DOCUMENTS

| | | | |
|---|---|---|---|
| 4,709,775 A | 12/1987 | Watanabe et al. | |
| 5,545,103 A * | 8/1996 | Gustin ..................... | 475/223 |
| 6,012,560 A * | 1/2000 | Kuroda et al. ............ | 192/35 |
| 6,533,090 B2 * | 3/2003 | Osborn et al. ............ | 192/48.2 |
| 6,951,521 B2 * | 10/2005 | Hakui ...................... | 475/150 |
| 2004/0055844 A1 * | 3/2004 | Ebenhoch et al. ........ | 192/53.1 |

FOREIGN PATENT DOCUMENTS

| | | |
|---|---|---|
| DE | 3814435 A1 | 11/1968 |
| DE | 2513595 B2 | 10/1976 |
| DE | 3600870 C1 | 6/1987 |
| DE | 3814435 | 11/1988 |
| DE | 40 19 763 A1 | 1/1992 |
| DE | 4019763 | 1/1992 |
| DE | 196 11 058 A1 | 9/1996 |
| EP | 462 400 B1 | 5/1991 |
| JP | 61155027 | 7/1986 |

* cited by examiner

*Primary Examiner*—Richard M. Lorence
*Assistant Examiner*—John V. Ligerakis
(74) *Attorney, Agent, or Firm*—Harness, Dickey & Pierce, P.L.C.

(57) ABSTRACT

An all-wheel transmission system includes an input shaft, a first output shaft and two mutually independently controllable friction clutches for the metering the transfer of drive torque from a powertrain to a first axle assembly and a second axle assembly. The first friction clutch includes a first clutch component rotationally connected to an input shaft and of a second clutch component rotationally connected to a first output shaft while the second friction clutch includes a first clutch component rotationally connected to the input shaft and a second clutch component rotationally connected to a second output shaft. One of the friction clutches can be selectively bridged via coordinate actuation of a bridging clutch.

22 Claims, 3 Drawing Sheets

ALL-WHEEL TRANSMISSION SYSTEM

CROSS-REFERENCE TO RELATED APPLICATIONS

This application claims the benefit of Austrian Utility Model No. GM 0523/2005, filed on Jul. 29, 2005, the entire disclosure of which is incorporated herein by reference.

FIELD OF THE INVENTION

The invention relates to an all-wheel transmission system for a motor vehicle comprising two mutually independent clutches operable for controlling the transfer of drive torque from a powertrain to a first axle assembly and a second axle assembly, wherein an input shaft can be drivingly connected to a first output shaft associated with the first axle assembly via a first controllable friction clutch and drivingly connected to a second output shaft associated with the second axle assembly via a second controllable friction clutch. An all-wheel transmission system of this type makes it possible to selectively meter between 0 and 100% of the available drive torque independently to each axle assembly.

BACKGROUND OF THE INVENTION

An example of an all-wheel transmission system is disclosed in U.S. Pat. No. 4,709,775 and referred to as a so-called distributor transmission. Specifically, this distributor transmission includes two multi-plate friction clutches that are accommodated in a common housing which also acts as a clutch component for both friction clutches. The friction clutches are hydraulically actuated so that the torque transmitted can be controlled by modulating the fluid pressure.

In such torque distributor transmissions, operational safety makes it necessary for the friction clutches to automatically adopt a safe position in the event of a system failure, and yet be sufficiently engaged when the vehicle is parked to maintain a locking torque. Operational safety in a larger sense also includes the ability to provide a limp-home mode which permits the vehicle to be driven to a repair shop in the event of a system failure.

SUMMARY OF THE INVENTION

It is an object of the present invention to equip an all-wheel transmission system with friction clutches which satisfy all of these operational demands.

This and other objects are achieved in accordance with the present invention by providing an all-wheel transmission system having an input shaft, first and second output shafts and first and second friction clutches. The first friction clutch includes a first clutch component rotationally connected to the input shaft, a second clutch component rotationally connected to the first output shaft, a first clutch pack operably disposed between the first and second clutch components, and a first clutch actuator for controlling adaptive engagement of the first clutch pack. The second friction clutch includes of a first clutch component rotationally connected to the input shaft, a second clutch component rotationally connected to the second output shaft, a second clutch pack operably disposed between the first and second clutch components, and a second clutch actuator for controlling adaptive engagement of the second clutch pack. It is an important feature of the present invention that one of the first and second friction clutches can be locked out or "bridged" via actuation of a bridging clutch.

As a related feature of the present invention, actuation of the bridging clutch establishes a connection between the input shaft and the corresponding output shaft which effectively acts as a parking block and also allows emergency operation of the vehicle in the event of a system failure.

Pursuant to another feature of the present invention, the clutch actuators may include ramp rings which can be rotated relative to one another and which cooperate with moveable pressure pistons for controlling engagement of the clutch packs associated with the friction clutches. The ramp rings have projecting lever arms which engage a rotary cam operated by a power-operated device, such as an electric motor. The ramp rings are easily accessible and the ramp ring located remote from the pressure piston can be supported without any additional construction effort.

In accordance with another feature of the present invention, a primary clutch part of the bridging clutch is located at an outer clutch component of the bridgeable friction clutch and a secondary clutch part is associated with the pressure piston of the bridgeable friction clutch. The assembly effort and the space requirements of the bridging clutch are thus minimal.

In the case of an all-wheel transmission system in which the second output shaft drives an offset drive unit to establish the drive connection with the second axle assembly, the bridging clutch is preferably associated with the first friction clutch.

The present invention also relates to an individual friction clutch for use in an all-wheel transmission system. The friction clutch includes an inner clutch component, an outer clutch component, a multi-plate clutch pack therebetween, a clutch actuator for regulating engagement of the clutch pack, and a bridging clutch. The bridging clutch includes a primary clutch part fixed for rotation with the outer clutch component and a secondary clutch part connected for rotation with the inner clutch component. The secondary clutch part is moveable between a first position and a second position. In its first position, the secondary clutch part is in coupled engagement with the primary clutch part to establish a locked mode for the bridging clutch. In its second position, the secondary clutch part is released from engagement with the primary clutch part to establish an open mode for the bridging clutch.

The primary clutch part of the bridging clutch is preferably fastened to the outer clutch component of the friction clutch which forms a drum surrounding the clutch pack and the secondary clutch part is rotationally connected to a pressure piston which, in turn, is rotatably connected to with the inner clutch component of the friction clutch. Thus, the bridging clutch functions to connect the inner and outer clutch components of the bridgeable friction clutch over the shortest distance, with the pressure piston serving as an intermediate or bridging member.

In a further development of the present invention, the bridging clutch includes a spring biasing mechanism to accommodate and overcome out of engagement situations between the primary and secondary parts of the bridging clutch. For this purpose, and in accordance with the present invention, the secondary clutch part of the bridging clutch is displaceable relative to the pressure piston and is biased by a spring in the engagement direction. The spring is installed such that it is supported between a shoulder of the pressure piston and a flange portion of the secondary clutch part. A wave spring is preferred since it requires a relatively small installation space, particularly as it has to be weaker than the return spring associated with the friction clutch.

To ensure precise operation of the clutch actuators, they must be periodically calibrated. Calibration is understood as the process of moving a component to at least one operating point and comparing the feedback signal, typically a position signal, with the desired value of the operating point. This is typically done with the vehicle at a standstill, with a suitable time for this being after shutdown of the vehicle (switching off of the ignition). A method of calibrating the friction clutches of an all-wheel transmission system in accordance with the present invention includes the following steps, wherein the bridging clutch is associated with the first friction clutch. When the vehicle is shut down, the drive connection may not be interrupted in order to maintain the parking block feature. For this reason, the second friction clutch is initially shifted into its fully engaged mode for establishing this drive connection and then the first friction clutch is calibrated by moving a moveable component of its clutch actuator to an operating point. Following calibration, the first friction clutch is returned to its fully released mode whereat the bridging clutch is shifted into its locked mode. Thereafter, the second friction clutch is brought into its fully released mode. The precaution is thus taken for the case that the bridging clutch is in an out of engagement condition and is not able to fully engage. The release of the second friction clutch permits a small amount of rotation which eliminates the out of engagement condition for the bridging clutch. The vehicle has now been securely shut down and the second friction clutch can thereafter be calibrated.

When a parked vehicle with calibrated friction clutches is later put back into operation, the second friction clutch is fully engaged prior to release of the bridging clutch. Thereafter, the first friction clutch is brought into an operating mode without the drive connection being fully interrupted.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further objects, features and advantages of the present invention will become apparent to these skilled in the art from analysis of the following written description, the appended claims, and the accompanying drawings in which:

DETAILED DESCRIPTION OF THE PREFERRED EMBODIMENTS

The present invention is generally related to an all-wheel transmission system operable to permit adaptive control of the drive torque transferred from a powertrain to first and second drivelines in an all-wheel drive or four-wheel drive motor vehicle. Thus, while the present invention is hereinafter described in association with one or more particular drivetrain arrangements for specific vehicular applications, it is to be understood that the arrangements shown and described are merely intended to illustrate possible embodiments of the present invention.

Figure 1:
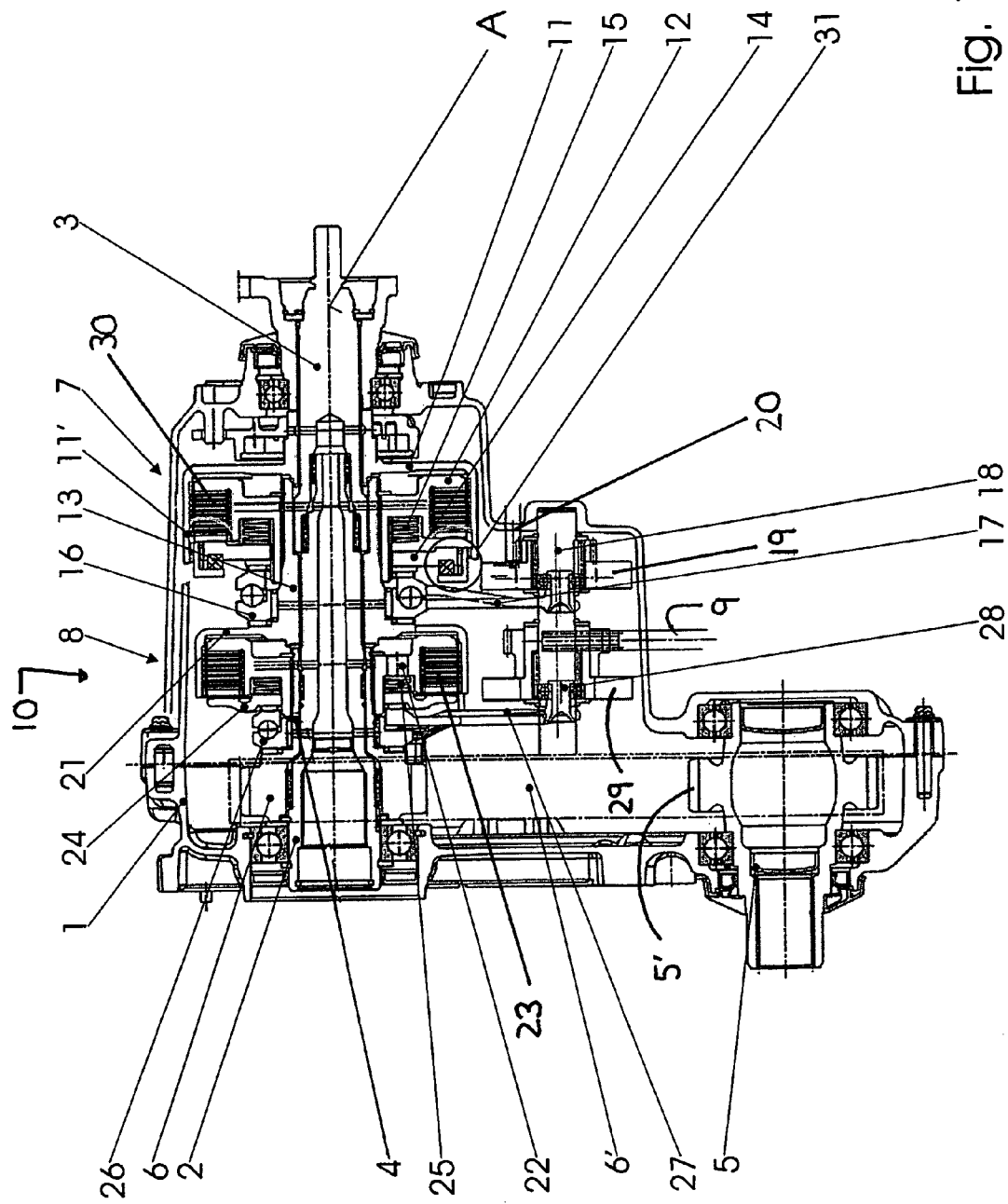
FIG. 1 is a sectional view of an all-wheel transmission system constructed in accordance with the present invention for use in an all-wheel drive motor vehicle.

Referring to FIG. 1, an all-wheel transmission system, hereinafter referred to as torque distributor unit 10, is shown. Torque distributor unit 10 is applicable for installation in an all-wheel drive or four-wheel drive motor vehicle having a powertrain and first and second drivelines. Torque distributor unit 10 generally includes a housing 1, an input shaft 2 adapted to be driven by the powertrain (i.e., engine/transmission), a first output shaft 3 adapted for connection to the first driveline and a second output shaft 4 adapted for connection to the second driveline. In one preferred, but non-limiting, drivetrain arrangement, the first driveline is a rear driveline having a rear driveshaft directly connecting first output shaft 3 to a rear axle assembly while the second driveline is a front driveline having a front driveshaft operably connecting second output shaft 4 to a front axle assembly. As seen, shafts 2, 3 and 4 are coaxial and supported by suitable bearings for rotation about the "A" axis. To provide means for transferring drive torque from second output shaft 4 to the front driveshaft, torque distributor unit 10 includes a transfer assembly having a drive sprocket 6 fixed for rotation with second output shaft 4, a driven sprocket 5' fixed to an offset shaft 5 and a power chain 6' meshed with the drive and driven sprockets. As understood, offset shaft 5 is adapted for connection to one end of the front driveshaft, the opposite end of which is connected to the front axle assembly. It is contemplated that a geared transfer assembly could be used in place of the sprocket and chain assembly shown.

Torque distributor unit 10 includes a first friction clutch 7 and a second friction clutch 8. First friction clutch 7 is operably disposed between input shaft 2 and first output shaft 3 and is shown to include a first clutch component 11, a second clutch component 12, and a first clutch pack 30 having alternatively arranged inner and outer disks operably disposed between clutch components 11 and 12. First clutch component 11 is a bell-shaped drum that is fixed for rotation with first output shaft 3 such as, for example, by a splined connection. Second clutch component 12 is a hub having an annular portion that is coupled (i.e., splined) for rotation with a tubular end portion of a hub shaft 13. Hub shaft 13 is, in turn, coupled (i.e., splined) for common rotation with input shaft 2 about the A axis.

First friction clutch 7 also includes a first spring-biased pressure piston 14 arranged to apply a compressive clutch engagement force on first clutch pack 30. First piston 14 is splined for rotation with clutch hub 12 and is axially moveable relative to clutch hub 12 between a first position and a second position via selective actuation of a first clutch actuator 18. First piston 14 is operable in its first position to apply a maximum compressive clutch engagement force on clutch pack 30 for transferring drive torque from input shaft 2 to first output shaft 3, thereby defining a fully engaged mode for first friction clutch 7. In contrast, first piston 14 is operable in its second position to release the clutch engagement force from clutch pack 30 so as to interrupt the transfer of drive torque from input shaft 2 to first output shaft 3 and define a released mode for first friction clutch 7. As seen, a return spring 15 is disposed between first piston 14 and clutch hub 12 for normally urging first piston 14 toward its second position. As will be detailed, first clutch actuator 18 is operable to control movement of first piston 14 between its first and second positions for adaptively regulating the drive torque transferred from input shaft 2 to first output shaft 3.

First clutch actuator 18 includes a pair of relatively rotatable ramp rings 16 having lever arms 17, at least one of which engages a cam surface on a rotary cam 19 driven by a power-operated device, such as an electric motor. FIG. 1 shows a portion of a motor shaft 20 driving a gearset which, in turn, drives rotary cam 19. Actuation of the electric motor controls the angular position of rotary cam 19 which, in turn, controls relative rotation between ramp rings 16 for controlling axial movement of first piston 14 between its first and second positions. Ramp rings 16 are shown to be rotatably supported on hub shaft 13.

Second friction clutch 8 is operably disposed between input shaft 2 and second output shaft 4 and is shown to include a first clutch component 21, a second clutch component 22, and a second clutch pack 23 of interleaved inner and outer disks operably disposed therebetween. First clutch component 21 is a bell-shaped drum that is fixed to, or integral with, hub shaft 13 while second clutch component 22 is a clutch hub that is fixed (i.e., splined) for rotation with second output shaft 4. Second friction clutch 8 also includes a second spring-biased pressure piston 24 arranged to apply a compressive clutch engagement force on second clutch pack 23. Second piston 24 is splined for rotation with clutch hub 22 and is axially moveable relative to clutch pack 23 between a first position and a second position via selective actuation of a second clutch actuator 28. Second piston 24 is operable in its first position to apply a maximum clutch engagement force to second clutch pack 23 for transferring drive torque from input shaft 2 to second output shaft 4 and define a fully engaged mode for second friction clutch 8. In contrast, second piston 24 is operable in its second position to release engagement of second clutch pack 23 so as to interrupt the transfer of drive torque from input shaft 2 to second output shaft 4 and define a released mode for second friction clutch 8. As seen, a return spring 25 is arranged to normally bias second piston 24 toward its second position. Second clutch actuator 28 is operable to control movement of second piston 24 between its first and second positions for adaptively regulating the drive torque transferred from input shaft 2 to second output shaft 4.

Second clutch actuator 28 also includes a pair of relatively rotatable ramp rings 26 having lever arms 27, at least one of which engages a cam surface on a rotary cam 29 driven by a power-operated device, such as an electric motor. FIG. 1 shows a portion of a motor shaft 9 driving a gearset which, in turn, drives rotary cam 29. Actuation of the electric motor controls the angular position of rotary cam 29 which, in turn, controls relative rotation between ramp rings 26 for controlling corresponding axial movement of second piston 24 between its first and second positions. Ramp rings 26 are shown to be rotatably supported on second output shaft 4 between drive sprocket 6 and clutch hub 22.

Figure 3:
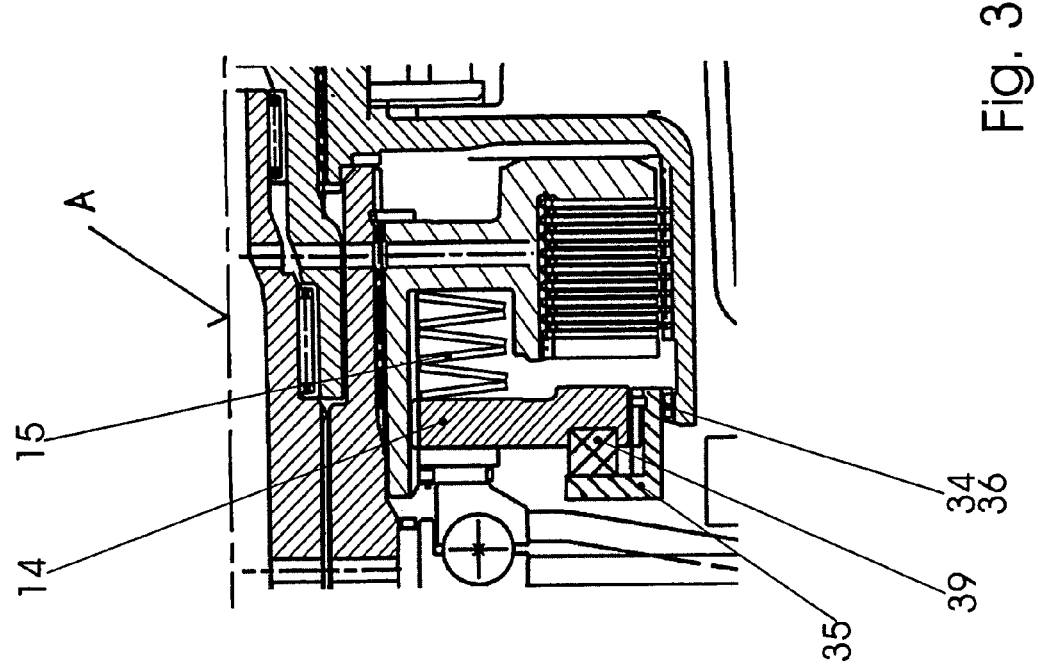
FIG. 3 is another partial view of the all-wheel transmission system showing the first friction clutch in a released mode and its associated bridging clutch in a locked mode.
Figure 2:
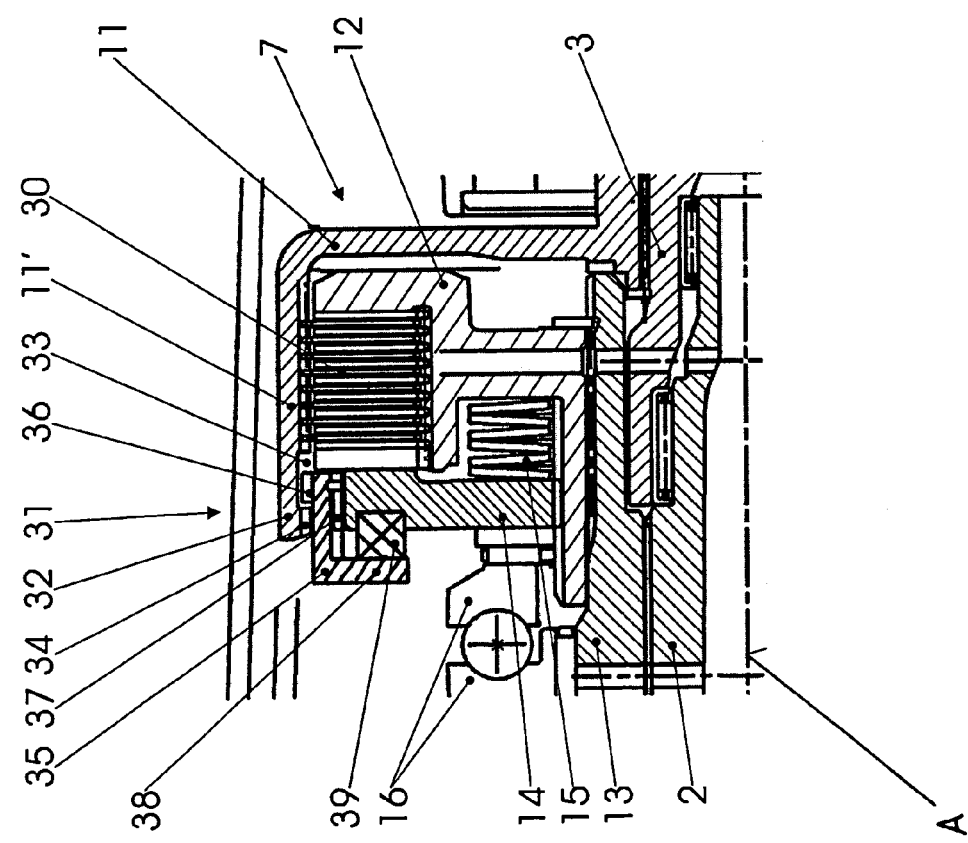
FIG. 2 is a partial sectional view of the all-wheel transmission system showing a first friction clutch in an engaged mode and its associated bridging clutch in an open mode.

As best seen from FIGS. 2 and 3, first friction clutch 7 also includes a lock-out or bridging clutch 31 that is operable for selectively coupling clutch hub 12 to clutch drum 11, thereby establishing a locked or bridged connection between input shaft 2 and first output shaft 3. In particular, bridging clutch 31 includes a primary clutch part 32 fixed to or formed at an end of an outer rim portion 11' of clutch drum 11 and a secondary clutch component 35 which is fixed via a splined coupling 37 to an outer rim portion of first piston 14. Primary clutch part 32 is shown to include internal clutch engagement members such as, for example, internal clutch teeth 34. Splined coupling 37 functions to cause secondary clutch part 35 to commonly rotate with first piston 14 and yet permit axial sliding movement of secondary clutch part 35 relative to first piston 14 and primary clutch part 32. Secondary clutch part 35 includes clutch engagement members such as, for example, external clutch teeth 36 which can be brought into meshed engagement with internal clutch teeth 34 of primary clutch part 32. An annular internal non-toothed section or free zone 33 is formed in clutch drum 11 adjacent to internal clutch teeth 34 to permit rotation of first piston 14 (and hub 12) relative to drum 11. Secondary clutch part 35 further includes a radial flange plate 38 which extends inwardly to overlay a portion of first piston 14. A biasing device 39 is operably disposed between flange plate 38 of secondary clutch part 35 and first piston 14. Biasing device 39 can be any type of devices or members (i.e., coil springs, wave springs or a compressible rubber ring) which provides a biased orientation between secondary clutch part 35 and first piston 14.

Referring to FIG. 2, first friction clutch 7 is generally shown operating in its engaged mode with first piston 14 axially moved by first clutch actuator 18 to its first position. Likewise, bridging clutch 31 is shown operating in an open mode which is established when secondary clutch part 35 is located in a first position whereat its clutch teeth 36 are located in free zone 33 so as to be released from engagement with clutch teeth 34 on primary clutch part 32. As noted, first friction clutch 7 is normally operable to adaptively regulate the amount of drive torque transferred from input shaft 2 to first output shaft 3. Such adaptive torque transfer is permitted when bridge clutch 31 functions in its open mode to accommodate relative rotation between clutch hub 12 (driven by input shaft 2 and hub shaft 13) and clutch drum 11 (driving first output shaft 3). Variable control of the axial position of first piston 14 relative to clutch pack 30 permits variable control over the drive torque transferred through first friction clutch 7. As understood, control signals are sent to the electric motor associated with first clutch actuator 18 for controlling movement of first piston 14. Likewise, variable control over the axial position of second piston 24 relative to second clutch pack 23 permits variable control over the drive torque transferred through second friction clutch 8 from input shaft 2 to second output shaft 4. Again, control signals are sent to the electric motor associated with second clutch actuator 28 for controlling such movement of second piston 24.

When it is desired to shift first friction clutch 7 into its released mode, ramp rings 16 rotate to a position permitting return spring 15 to forcibly urge first piston 14 to move axially to its second position. However, this movement of first piston 14 also results in axial movement of second clutch part 35 toward a second position. Such movement of secondary clutch part 35 from its first position toward its second position causes its clutch teeth 36 to exit free zone 33 and engage clutch teeth 34 on primary clutch part 32, thereby shifting bridging clutch 31 into a locked mode. With bridging clutch 31 in its locked mode, first piston 14 functions as a bridging member to positively couple clutch drum 11 for common rotation with clutch hub 12, thereby establishing a direct connection between input shaft 2 and first output shaft 3. The biasing force of return spring 15 is selected to be sufficient to move first piston 14 to its second position in the event that first clutch actuator 18 fails. Thus, first friction clutch 7 is automatically returned to its fully released mode while bridging clutch 31 is shifted into its locked mode.

If a tooth block condition occurs between clutch teeth 34 and 36 which prevents secondary clutch part 35 of bridging clutch 31 from moving into its second position, axial movement of first piston 14 to its second position causes compression of biasing device 39. Thereafter, any slight relative rotation between the components of bridging clutch 31 will act to release the tooth block condition such that the stored energy in the compressed biasing device 39 is released for forcibly moving secondary clutch part 35 into its second position with its clutch teeth 36 meshed with clutch teeth 34 on primary clutch part 32. Operation of bridging clutch 31 in its locked mode ensures the function of a pre-established park block when the vehicle is shut down and further provides failsafe ("limp home") emergency operation of the vehicle if the clutch actuator system fails.

It is a design requirement of torque distributor unit 10 that both friction clutches 7 and 8 are not simultaneously operated in their released modes, at least when the vehicle is in a non-motive state. On the other hand, it is required to provide precise control of both friction clutches 7 and 8 to permit calibration of both clutch actuators 18 and 28 on a periodic basis. For calibration purposes, it is required to determine the deviation between a desired set position of first piston 14 (as generated by clutch actuator 18) and the actual set position measured, for instance, by a transducer (not shown). Thereafter, a correction is made to eliminate this positional deviation. Since calibration processing generally takes up to a few seconds to complete, it is preferred to implement this calibration process subsequent to shutting down the vehicle, (i.e., switching off the vehicle).

To bring this calibration requirement in line with the demand that both friction clutches are not released at the same time, a method of calibration in accordance with the present invention is applied. First, second friction clutch 8 is fully engaged such that first clutch actuator 18 associated with first friction clutch 7 can be calibrated. Once first clutch actuator 18 has been calibrated, it is activated to shift first friction clutch 7 into its fully released mode such that bridging clutch 31 is shifted into its locked mode. To eliminate any tooth block conditions in bridging clutch 31, second friction clutch 8 is fully released. Thereafter, it is possible to accurately calibrate second clutch actuator 28 associated with second friction clutch 8. Upon subsequent operation of the vehicle, second friction clutch 8 is first shifted into its fully engaged mode and only then is first friction clutch 7 actuated to shift bridging clutch 31 out of its locked mode.

It is a safety requirement that, upon a system failure, the friction clutches move into their released mode without any application of external force. A further requirement consists of still being able to reach the next repair shop under one's own power following a system failure. The shape-matched bridging clutch 31 also makes this possible because, upon a system failure, it automatically moves into its locked mode due to the full opening of first friction clutch 7.

Figure 4:
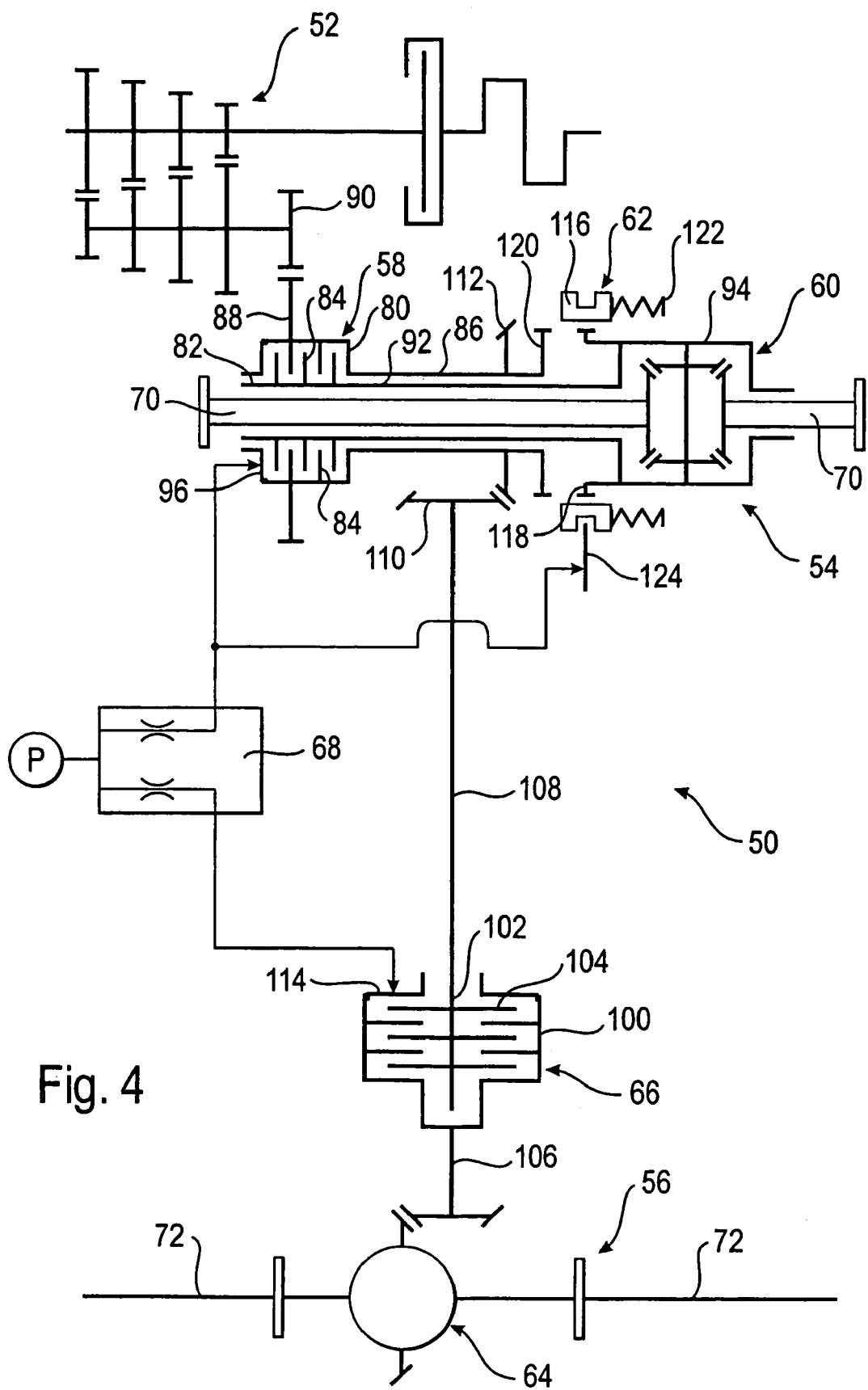
FIG. 4 is a schematic embodiment of a motor vehicle equipped with an all-wheel transmission system in accordance with an alternative embodiment of the present invention.

In FIG. 4, an all-wheel transmission system in accordance with the invention is designated by reference numeral 50. It includes a change gearset 52, a first axle assembly 54 and a second axle assembly 56. First axle assembly 54 includes a first friction clutch 58, a differential 60 and a shape-matched bridging clutch 62. Second axle assembly 56 includes a differential 64 and is in driving connection with first axle assembly 54 via a second friction clutch 66. A control unit 68 is operable to actuate first and second friction clutches 58 and 66, with drive torque being distributed between first axle assembly 54 and second axle assembly 56. Differential 60 of first axle assembly 54 drives a first pair of output shafts 70 while differential 64 of second axle assembly 56 drives a second pair of output shafts 72.

First friction clutch 58 includes an outer clutch component 80 and an inner clutch component 82. Outer clutch component 80 surrounds a first clutch pack 84 consisting of alternately arranged inner and outer disks. Outer clutch component 80 is fixedly connected to an outer hollow shaft 86 and includes a gear wheel 88 which is meshed with an output gear wheel 90 of change gearset 52. Inner clutch component 82 is fixedly connected to an inner hollow shaft 92 which, in turn, is connected to a housing 94 of differential 60. Clutch pack 84 is controllably compressed against the force of return springs (not shown) by a pressure piston 96 which is rotationally fixed to, but axially moveable on, one of inner clutch component 82 and outer clutch component 80. A first clutch actuator (not shown), for example a pair of relatively rotatable ramp rings with shear levers, is provided for controlling adaptive engagement of first friction clutch 58.

Second friction clutch 66 likewise includes an outer clutch component 100 and an inner clutch component 102. Outer clutch component 100 surrounds a second clutch pack 104 and is rotationally coupled to a pinion shaft 106 which drives differential 64. Inner clutch component 102 is rotationally coupled to a longitudinal driveshaft 108 which includes a gear wheel 110 meshed with a gear 112 fixed to outer hollow shaft 86 of first axle assembly 54. Clutch pack 104 is controllably compressed against the force of return springs (not shown) by a second pressure piston 114 which is rotationally fixed to, but axially moveable on, one of inner clutch component 102 and outer clutch component 100. A second clutch actuator (not shown) is provided for controlling engagement of second friction clutch 66.

Bridging clutch 62 has a primary part 116 which is rotationally fixed to, and axially moveable on, housing 94 of differential 60 via a sliding toothed arrangement 118. Primary part 116 can be selectively coupled to an associated secondary part 120 which is fixedly connected to outer hollow shaft 86 of first axle assembly 54. Specifically, primary part 116 is rotationally coupled to secondary part 120 in a first position so that outer hollow shaft 86 is rotationally coupled to housing 94 of differential 60. Bridging clutch 62 thereby bridges first friction clutch 58 and defines a locked mode. Primary part 116 is released from engagement with secondary part 120 in a second position so that outer hollow shaft 86 of first axle assembly 54 is permitted to rotate relative to housing 94 of differential 60, thereby defining a released mode for bridging clutch 62.

A spring 122 acts to bias primary part 116 in the direction of its first position. During operation of all-wheel transmission system 50, control unit 68 actuates primary part 116 against the bias of spring 122 in the direction of its second position via an actuator 124 so that control of the torque distribution can take place between first axle assembly 54 and second axle assembly 56. When the vehicle is being parked, actuator 124 is deactivated such that primary part 116 is moved to its first position to rotationally couple output shafts 70 of first axle assembly 54 with outer hollow shaft 86 and thus with output gear wheel 90 of transmission 52, thereby preventing movement of the vehicle. Thus, bridging clutch 62 ensures the function of a pre-connected park block and also permits an emergency operation of the vehicle on a system failure.

In a further embodiment of the all-wheel transmission system 50 (not shown) in accordance with FIG. 4, bridging clutch 62 can be provided between outer clutch component 100 of second friction clutch 66 and driveshaft 108. In a first axial position, a primary part of bridging clutch 62 would be connected to a secondary part fixed to driveshaft 108, whereby driveshaft 108 is rotationally connected to pinion shaft 106 for driving differential 64 of second axle assembly 56. Thus, bridging clutch 62 would bridge second friction clutch 66. In a second axial position, the primary part of bridging clutch 62 would be out of engagement with respect to the secondary part associated with driveshaft 108 so that driveshaft 108 is rotatable relative to differential 64.

The description of the present invention is merely exemplary in nature and, thus, variations that do not depart from the gist of the inventions are intended to be within the scope of the invention. Such variations are not to be regarded as a departure from the spirit and scope of the inventions.

What is claimed is:

1. An all-wheel transmission system comprising two mutually independent clutches operable for controlling the transfer of drive torque from a powertrain to a first axle and a second axle, wherein an input shaft is drivingly connectable to a first output shaft associated with the first axle via a first controllable friction clutch and to a second output shaft associated with the second axle via a second controllable friction clutch wherein:

said first friction clutch includes of a first component rotationally connected to said input shaft, a second component rotationally connected to said first output shaft and a first actuator for actuating said first friction clutch;

said second friction clutch includes a first component rotationally connected to said input shaft, a second component rotationally connected to said second output shaft and a second actuator for actuating said second friction clutch; and a bridging clutch arranged in parallel to one of said first and second friction clutches to selectively operate said one of the first and second friction clutches in a locked mode.

2. The all-wheel transmission system in accordance with claim 1, wherein the respective first components of said first and second friction clutches are each an inner part and the respective second components are each an outer part.

3. The all-wheel transmission system in accordance with claim 1, wherein said respective first and second actuators of said friction clutches each have a pressure piston that is spring-loaded toward a released position.

4. The all-wheel transmission system in accordance with claim 3, wherein mutually relatively rotatable ramp rings cooperate with said pressure pistons, said ramp rings having projecting levers engaging a cam operated by an electric motor.

5. The all-wheel transmission system in accordance with claim 1, wherein said bridging clutch includes a primary part and a secondary part which each have cooperating engagement parts, wherein said primary part is rotationally connected to one of said first and second components of said one of the first and second friction clutches and said secondary part is rotationally connected to the respective other component of said one of the first and second friction clutches.

6. The all-wheel transmission system in accordance with claim 5, wherein said bridging clutch is biased in the engagement sense by a spring, said spring is supported between a displaceable pressure piston of said one of the first and second friction clutches and said secondary part of said bridging clutch, and wherein said secondary part is displaceable relative to said primary part.

7. The all-wheel transmission system in accordance with claim 5, wherein said primary part is formed at an outer portion of said second component of said one of the first and second friction clutches and said secondary part is associated with a pressure piston.

8. The all-wheel transmission system in accordance with claim 1, wherein said second output shaft has a driving wheel for an offset drive establishing the connection to the second axle, and wherein said bridging clutch is associated with said first friction clutch.

9. The all-wheel transmission system in accordance with claim 1, wherein said first friction clutch, said second friction clutch and said bridging clutch are located within a common housing.

10. A method of calibrating friction clutches together with a corresponding actuator mechanism of an all-wheel transmission system in accordance with claim 1, wherein said bridging clutch is associated with said first friction clutch, the method comprising:

fully closing said second friction clutch upon parking of the vehicle;

calibrating said first actuator associated with said first friction clutch by moving to at least one operating point;

engaging said bridging clutch; and calibrating said second actuator associated with said second friction clutch by moving to at least one operating point.

11. The method in accordance with claim 10, wherein said first friction clutch is fully open for the step of engaging said bridging clutch.

12. The method in accordance with claim 10, wherein said second friction clutch is fully opened after engaging said bridging clutch and before calibrating said second actuator of said second friction clutch.

13. The method in accordance with claim 10, wherein, when the vehicle with the all-wheel transmission system is put back in operation with the calibrated clutches, first closing said second friction clutch and then releasing said bridging clutch associated with said first friction clutch and bridging said first friction clutch into an operating position.

14. A friction clutch for an all-wheel transmission system which comprises an inner clutch component and an outer clutch component with interleaved clutch disks which can be engaged in a regulated manner against a spring force, and a bridging clutch having a primary part and a secondary part, wherein said primary part and secondary part can be rotationally fixedly connected to one of said inner clutch component and said outer clutch component respectively, of said friction clutch, wherein said primary part of said bridging clutch is fastened to said outer clutch component of said friction clutch and said secondary part is rotationally fixedly connected and coupled in the axial direction to a pressure piston.

15. The friction clutch in accordance with claim 14, wherein said secondary part is displaceable in the axial direction on a pressure piston and is loaded by a spring in the engagement sense of said bridging clutch.

16. The friction clutch in accordance with claim 15, wherein said spring is a wave spring which is supported between a shoulder of said pressure piston and said secondary part.

17. An all-wheel transmission system for controlling transfer of drive torque from a powertrain to first and second drivelines, comprising:

an input shaft driven by the powertrain;

a first output shaft driving the first driveline;

a second output shaft driving the second driveline;

a first friction clutch having a first clutch component driven by said input shaft, a second clutch component driving said first output shaft, a first clutch pack operably disposed between said first and second clutch components, and a first actuator for controlling engagement of said first clutch pack;

a second friction clutch having a first clutch component driven by said input shaft, a second clutch component driving said second output shaft, a second clutch pack operably disposed between said first and second clutch components, and a second actuator for controlling engagement of said second clutch pack; and a bridging clutch associated with said first friction clutch that is operable for coupling said first clutch component of said first friction clutch to said second clutch component of said first friction clutch when said first actuator is released from engagement with said first clutch pack.

18. The all-wheel transmission system in accordance with claim 17 wherein said input shaft drives a hub shaft for rotation about a common axis, said hub shaft operable for commonly driving one of said first and second clutch components associated with said first friction clutch and one of said first and second clutch components associated with said second friction clutch.

19. The all-wheel transmission system in accordance with claim 17 wherein said first friction clutch includes a first piston rotationally driven by said first clutch component and moveable between first and second positions via actuation of said first actuator, wherein said first piston is operable in its first position to exert a clutch engagement force on said first clutch pack and in its second position to release engagement of said first clutch pack, and wherein said bridging clutch is operable in an open mode when said first piston is located in its first position so as to permit relative rotation between said first and second clutch components and is operable in a locked mode when said first piston is located in its second position so as to couple first clutch component to said second clutch component.

20. The all-wheel transmission system in accordance with claim 19 wherein said bridging clutch includes a first clutch part fixed for rotation with said second clutch component and a second clutch part rotationally driven by said first piston, said second clutch part is released from engagement with said first clutch part when said first piston is in its first position so as to define said open mode, and said second clutch part is engaged with said first clutch part when said first piston is in its second position so as to define said locked mode.

21. The all-wheel transmission system in accordance with claim 20 wherein said bridging clutch further includes a biasing device disposed between said first and second clutch parts.

22. The all-wheel transmission system in accordance with claim 20 wherein said first friction clutch includes a return spring operable for biasing said first piston toward its second position.

* * * * *